(12) United States Patent (10) Patent No.: US 7,202,627 B1
Min (45) Date of Patent: Apr. 10, 2007

(54) LOAD AND SPEED SENSITIVE MOTOR STARTING CIRCUIT AND METHOD

(75) Inventor: Young-Kee Min, Elm Grove, WI (US)

(73) Assignee: YKM Technologies, LLC, Elm Grove, WI (US)

( * ) Notice: Subject to any disclaimer, the term of this patent is extended or adjusted under 35 U.S.C. 154(b) by 0 days.

(21) Appl. No.: 11/389,953

(22) Filed: Mar. 27, 2006

(51) Int. Cl.
 *H02P 1/26* (2006.01)

(52) U.S. Cl. ............ 318/772; 318/727; 318/739; 318/755

(58) Field of Classification Search .......... 318/727, 318/739, 772, 755; 361/38; 307/64
See application file for complete search history.

(56) References Cited

U.S. PATENT DOCUMENTS

2005/0074665 A1* 4/2005 Spanziante et al. ........... 429/50

* cited by examiner

*Primary Examiner*—Karen Masih
(74) *Attorney, Agent, or Firm*—Joseph S. Heino; Patrick M. Bergin

(57) ABSTRACT

A circuit and method measures main motor winding voltage and detects points in the electromagnetic wave cycle where this voltage "crosses" zero. It also measures auxiliary motor winding voltage. Phase shifts measured in the auxiliary winding are compared as a means for starting and restarting the auxiliary winding. The points in the electromagnetic wave cycle where the current in the auxiliary winding "crosses" zero are detected and compared with a first window pulse that is generated when the main voltage crosses zero. When the zero current crossing points fall outside the first window pulse, the auxiliary winding is disconnected. The points where the voltage in the auxiliary winding "crosses" zero are also detected and compared with a second window pulse that is generated when the main voltage crosses zero. When the zero voltage crossing points fall within the second window pulse, the auxiliary winding is switched back into the circuit.

8 Claims, 3 Drawing Sheets

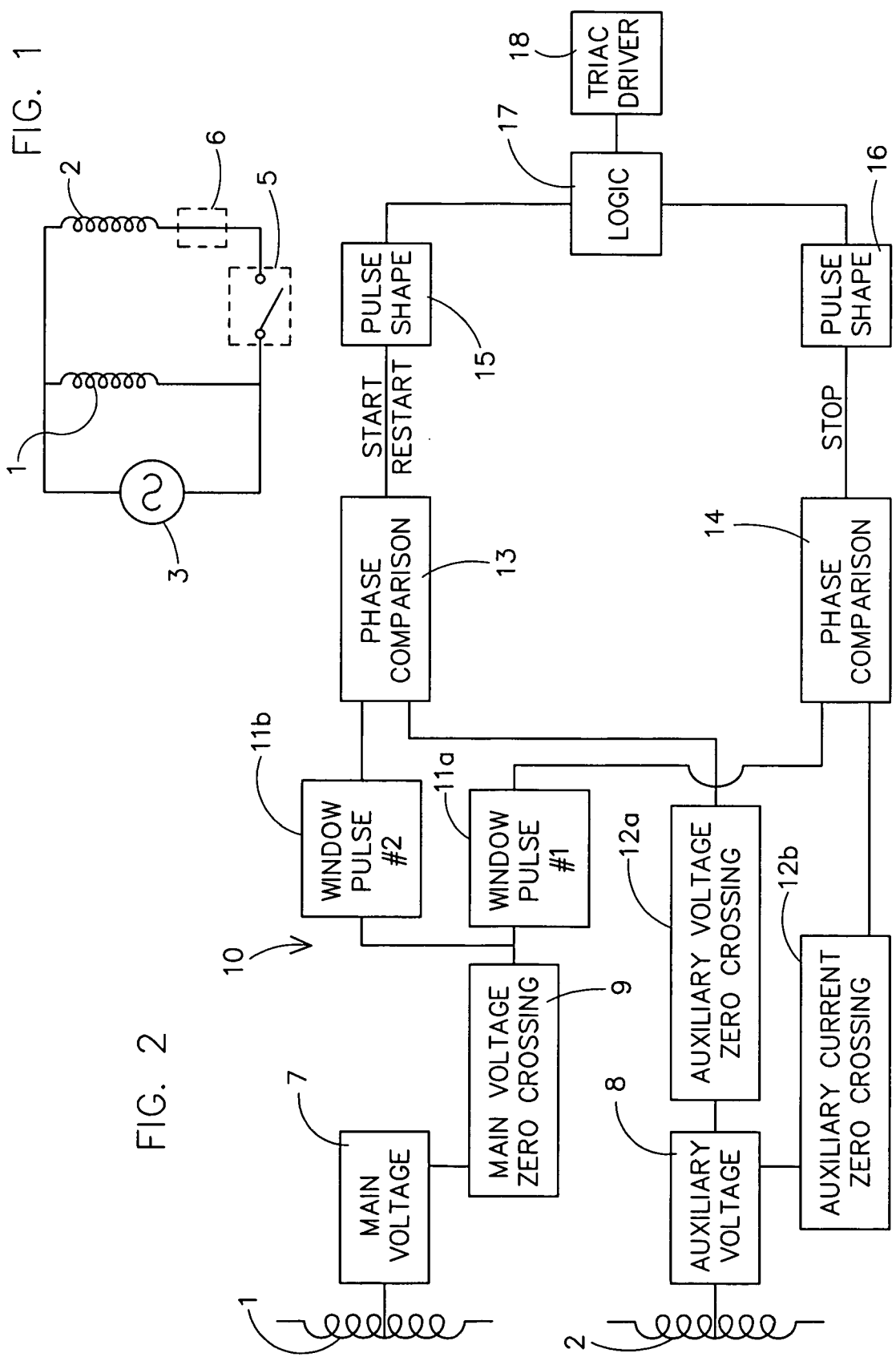

LOAD AND SPEED SENSITIVE MOTOR STARTING CIRCUIT AND METHOD

FIELD OF THE INVENTION

The present invention relates generally to alternating current (AC) motors and to disconnect switches and circuits for use with AC motors. More specifically, the present invention relates to an improved circuit and method used with the start, or auxiliary, winding of an AC motor wherein the auxiliary winding is energized when starting the motor from rest and then disconnected at a given motor speed. The present invention also relates to such a circuit and method used with both split-phase, capacitor-start, and capacitor-start/run motors.

BACKGROUND OF THE INVENTION

It is well known that a single-phase AC motor produces an alternating magnetic field, one pulling first in one direction, then in the opposite direction as the polarity of the magnetic field changes. This is because the single-phase AC motor is energized by a single alternating current source. The major distinction between the different types of single-phase AC motors is how they go about starting the motor in a particular direction. Motor start is usually accomplished by some device or circuit that introduces a phase-shifted magnetic field on one side of the motor shaft, or rotor.

Split-phase motors achieve their starting capability by having two separate windings wound in the motor stator. The two windings are separated such that one winding is used only for starting. The starting, or auxiliary, winding is wound with a smaller wire size having higher electrical resistance than the main windings. Both windings are energized when the motor is started. The starting winding produces a field that appears to rotate. This rotation causes the motor to start. A centrifugal switch then disconnects the starting winding when the motor reaches a predetermined speed.

The winding and centrifugal switch arrangement of a capacitor-start motor is similar to that used in a split-phase motor. In the capacitor-start motor, a capacitor is used in series with the starting winding to produce a phase shift and the appearance of a rotating field. Here again, when the motor approaches a predetermined running speed, the starting switch opens thereby disconnecting the starting winding and the motor continues to run. One starting circuit for use with a motor of this type is disclosed in U.S. Pat. No. 4,622,506. Another starting circuit for use with a motor of this type is disclosed in U.S. patent application Ser. No. 10/532,557. The method and apparatus of the present invention is an improvement of those starting circuits.

Various types of switches, and controls therefor, are also well known in the electrical arts. This includes the mechanical switch and the centrifugal actuator mounted on the motor rotor, as alluded to previously. Mechanical switches of the centrifugal type are subject to problems such as limited life, fatigue, friction, vibration, mounting position, contact wear, among others. Also, the centrifugal switch includes a radial member that blocks axial airflow through the motor, which may impair cooling. This radial member also requires additional room in the motor housing, which may be objectionable in various applications.

In another known start winding disconnect system, Hall effect sensors or pick-up coils are used to detect motor speed to actuate a disconnect switch. This approach may be objectionable because of the requirement of adding an extra element such as a magnet on the motor shaft, and the pick-up coil to sense speed. These extra parts and the assembly required may be cost objectionable.

In another known disconnect system, a timer is started upon initial energization of the motor. When the timer times out, the disconnect switch is actuated to disconnect the auxiliary winding. This approach is not load or speed sensitive, but rather disconnects the auxiliary winding only after a preselected time regardless of motor speed and regardless of load. This approach is limited to dedicated applications where the load on the motor is known beforehand, and the delay time set accordingly. If the load on the motor is increased, the motor speed will not be up to the desired threshold at the noted cutout time. On the other hand, if the load on the motor is decreased, the motor will accelerate faster, and full voltage will be applied across the capacitor for a longer time than is desired, which in turn may damage the motor and/or the capacitor. Capacitor burn-out is a significant problem when reducing the loading of the motor in timed disconnect systems.

Another known approach is to sense current through the main winding and then actuate the disconnect switch at a designated condition. This requires a current sensor in series with the main winding and the start or auxiliary winding, which is objectionable to many manufacturers because of the cost of the extra components and the assembly cost of modifying the circuit and inserting such components in series in the circuit. This approach may also be objectionable due to the extra wattage and heat because current is still flowing through the sensor in the run mode after starting.

SUMMARY OF THE INVENTION

The present invention addresses and solves the above noted and other problems in a particularly simple and effective electronic control system for an auxiliary winding disconnect switch. The invention is load and speed sensitive, and is AC line voltage fluctuation insensitive. The invention eliminates the need for extra components on the motor shaft, around the shaft, or in series in the motor circuit. There is no need for physical modification of the motor components or the windings.

The present invention provides a new and useful improved circuit and method for measuring the voltage at the main motor winding and detecting the points in the electromagnetic wave cycle at which this voltage "crosses" zero. In other words, it detects the points at which the main motor winding voltage switches instantaneously from positive to negative and vice versa. The method and circuit also measures the voltage at the auxiliary motor winding and similarly detects the points at which the auxiliary motor winding voltage switches instantaneously from positive to negative and vice versa. The phases of the voltages measured in the main winding and in the auxiliary winding are each compared by the circuit as a means for starting and restarting the auxiliary winding.

The improved circuit and method detects the points in the electromagnetic wave cycle where the current in the auxiliary winding "crosses" zero and compares the phase of these auxiliary current zero crossing points with a first window pulse that is generated when the main voltage crosses zero. The improved circuit and method also detects the points in the electromagnetic wave cycle where the voltage in the auxiliary winding "crosses" zero and compares the phase of these auxiliary voltage zero crossing points with a second window pulse that is generated when the main voltage crosses zero. When the auxiliary current zero crossing points fall outside the first window pulse, this means that the auxiliary winding is up to proper operating speed and the auxiliary winding is disconnected by the starting circuit. If the auxiliary voltage zero crossing points fall within the second window pulse, this means that the motor rotor speed has decreased below a certain predetermined speed and that the auxiliary winding will again be switched back into the circuit to boost the speed of the main motor winding.

As previously alluded to, the present invention provides an improvement over the circuit disclosed and claimed in U.S. Pat. No. 4,622,506. In the circuit of that embodiment, one was always measuring the voltage across the auxiliary winding. It also provides an improvement over co-pending U.S. patent application Ser. No. 10/532,557. In the circuit of that embodiment, one is always measuring the current zero crossing points in the auxiliary winding. In the further improved circuit of the present invention, one is always measuring the current zero crossing points and the voltage zero crossing points in the auxiliary winding. More specifically, the auxiliary winding voltage and its phase are measured based on RPM information available.

Other aspects and advantages of the new and useful improved circuit and method will be apparent to those having skill in the art upon review of the attached drawings and the following detailed description.

BRIEF DESCRIPTION OF THE DRAWINGS

FIG. 1 schematically shows a typical environment in which the preferred embodiment of the invention is used.

FIG. 2 is a schematic block circuit diagram illustrating a motor starting circuit in accordance with the invention.

DETAILED DESCRIPTION

Figure 3:
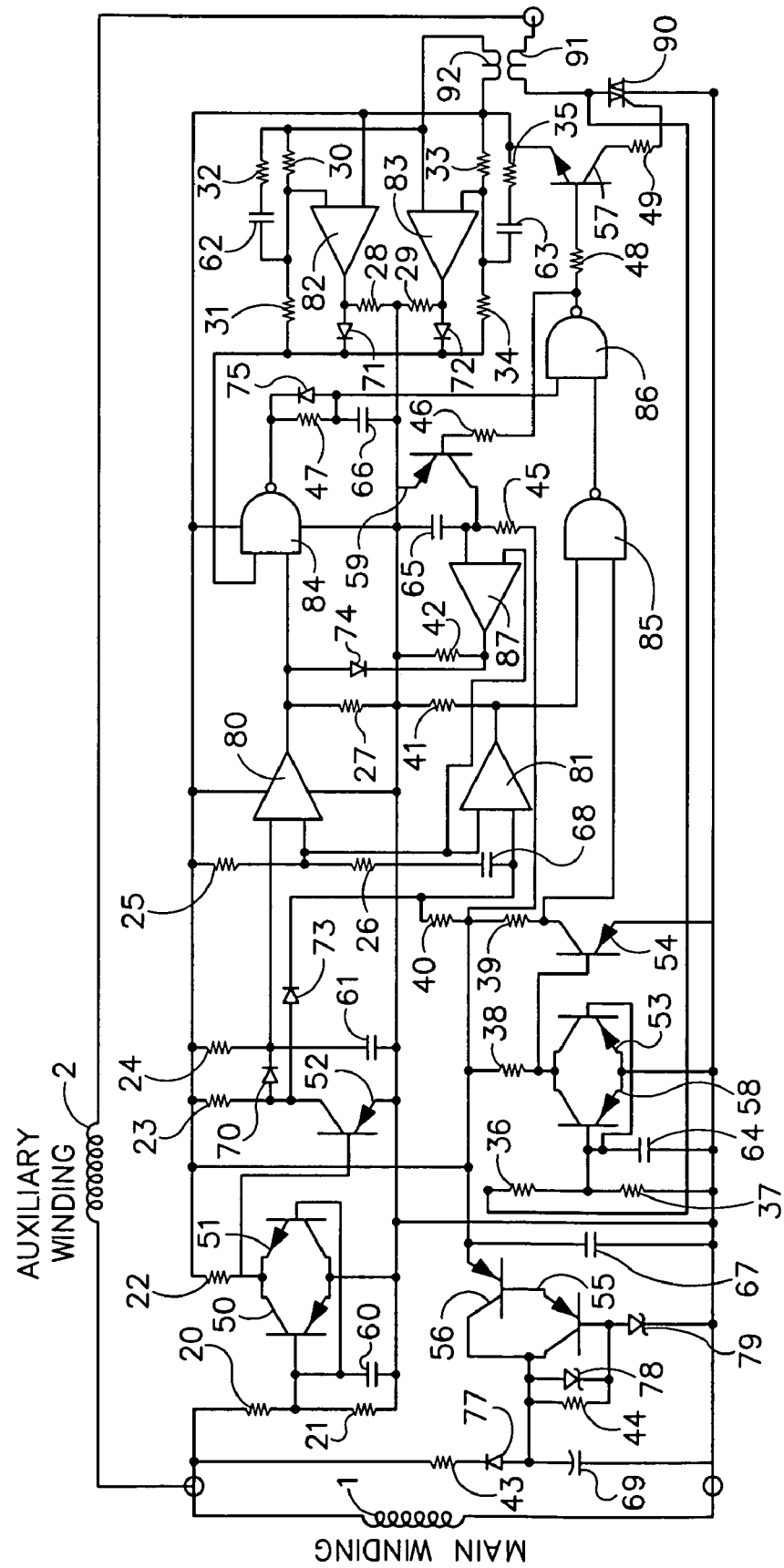
FIG. 3 is a detailed circuit diagram of the circuitry of FIG. 2.

Referring now to the drawings in detail wherein like numbered elements represent like elements throughout, FIG. 1 shows a main winding 1 and auxiliary winding 2 of an AC motor that are each connected to an AC power source 3. When the motor reaches a given threshold speed, a switch 5 that is connected in series with the auxiliary winding 2 is opened to disconnect the auxiliary winding 2 from the power source 3. A current detection means 6 is also provided for detecting and measuring the current flow through the auxiliary winding 2 when it is energized. The current detection means 6 provides the circuit of the present invention with the capability of detecting the points in the sinusoidal AC current waveform at which the current of the auxiliary winding 2 "crosses" the zero point. This will also be called the "current zero crossing" of the auxiliary winding 2. The significance of this will become more apparent later in this detailed description.

FIG. 2 shows a control circuit, generally identified 10, including main voltage detecting means 7 for sensing the magnitude of voltage across the main winding 1, and auxiliary voltage detector means 8 for sensing the magnitude of voltage across the auxiliary winding 2. A main voltage zero crossing means 9 is provided which senses the sinusoidal AC voltage waveform of the main winding voltage and the points at which the main winding voltage "crosses" zero or switches polarity. A first window pulse means 11a and a second window pulse means 11b respond to the main voltage zero crossing means 9 and each generates a window pulse. The width of either window pulse that is generated is not a limitation of the present invention. An auxiliary voltage zero crossing means 12a is provided which senses the points at which the auxiliary winding voltage "crosses" zero or switches polarity. An auxiliary winding current zero crossing means 12b is also provided which senses the current flow through the auxiliary winding 2 and the points at which the auxiliary winding current also "crosses" zero or switches flow direction, as was mentioned previously. A first phase comparator means 13 is provided which senses the auxiliary voltage zero crossing means 12a in relation to the second main voltage window pulse 11b that has been generated. A second phase comparator means 14 is provided which senses the auxiliary current zero crossing points in relation to the first main voltage window pulse 11a that has been generated. The first phase comparison means 13 generates a pulse shape 15 and the second phase comparison means 14 generates a pulse shape 16 as well. Logic means 17 is provided to respond to the pulse shapes 15, 16 to turn "off" or to turn "on" the switch 5. This can be done, for example, by means of a triac driver 18 to disconnect or reconnect, respectively, the auxiliary winding 2 from the AC power source 3.

FIG. 3 shows one embodiment of detailed circuitry for the schematic shown in FIG. 2 and like reference numerals are used to facilitate clarity. There are various portions of the detailed circuitry that correspond to the various functions illustrated in FIG. 2. For example, the final logic 17 portion of the schematic shown in FIG. 2 corresponds to the NAND gate 86 shown in FIG. 3. The gate 86 is used with other circuit components to trigger the triac 90 and to turn the auxiliary winding 2 on and off. A pair of windings 91, 92 are transformer windings that effectively provide current sensing means for the auxiliary winding 2.

FIG. 3 also shows that a power supply portion of the circuit includes a pair of transistors 55, 56 that are connected to other components including a pair of zener diodes 78, 79, a resistor 44 and a capacitor 67. The voltage across the main winding 1 is the same as the potential as across the resistor 43, the capacitor 69 and the diode 77.

Referring now to the main voltage zero crossing 9 and the auxiliary current zero crossing 12b portions of the circuit 10, it will be seen that the voltage 7 across the main motor winding 1 is at the same potential as that across the resistors 20, 21 of the circuit shown in FIG. 3. Also included in the main voltage zero crossing 9 portion of the circuit are two transistors 50, 51, a resistor 22 and a capacitor 60. A delay portion of the circuit is also provided by the resistors 23, 24, 25, 26, the diodes 70, 73, the transistor 52 and the capacitor 61. The auxiliary voltage zero crossing 12a portion of the circuit includes other resistors 36, 37, 38, 39, 40 capacitor 64, and transistors 53, 54, 58.

Phase comparison 13, 14 is initiated by use of comparators 80, 81. For example, the comparator 80 generates a first window pulse 11a that is compared to the auxiliary winding current zero crossing 12b portion of the circuit. The first window pulse shape generator 11a portion of the circuit includes the resistors 27, 41 and the capacitor 68. Similarly, the comparator 81 generates a second window pulse 11b that is compared to the auxiliary winding voltage zero crossing 12a portion of the circuit. The phase comparison portion of the circuit also includes comparators 82, 83, a number of resistors 28, 29, 30, 31, 32, 33, 34, 35, a pair of capacitors 62, 63 and a pair of diodes 71, 72. As shown, the output pins of the comparators 82, 83, respectively, feed into one of the input pins of a phase comparator gate 84.

The output pin of the phase comparator gate 84 generates a pulse 16 on the "stop" side of the circuit by means of the resistor 47, the capacitor 66 and the diode 75. This output is fed into an input gate of the final logic gate 86. Similarly, the output of the comparator 81 is fed into a gate of the comparator 85, the output of which is also fed into an input gate of the final logic gate 86. In this fashion, the pulse shapes 15, 16 are used to turn the triac driver 18 "on" and "off" as required. The triac switching circuit is provided by virtue of the resistors 48, 49 and the transistor 57 at the output pin of the logic gate 86. By use of this configuration, the triac driver 18 is switched on and off. See FIG. 2. A noise filter portion of the circuit includes comparator 87, resistors 42, 45, 46, capacitor 64 and diode 74, such not being a limitation of the present invention.

The initial starting of the motor on application of line voltage 3 is activated by means of the first phase comparison 13. The first phase comparison 13 senses the auxiliary winding voltage zero crossing relative to the main winding voltage second window pulse and initiates the triac turn on through logic 17. Immediately after the first turn on, the auxiliary winding 2 is kept energized by the second phase comparison 14. The maintenance of the auxiliary energization by means of winding current phase controls is explained in following paragraphs.

Figure 4:
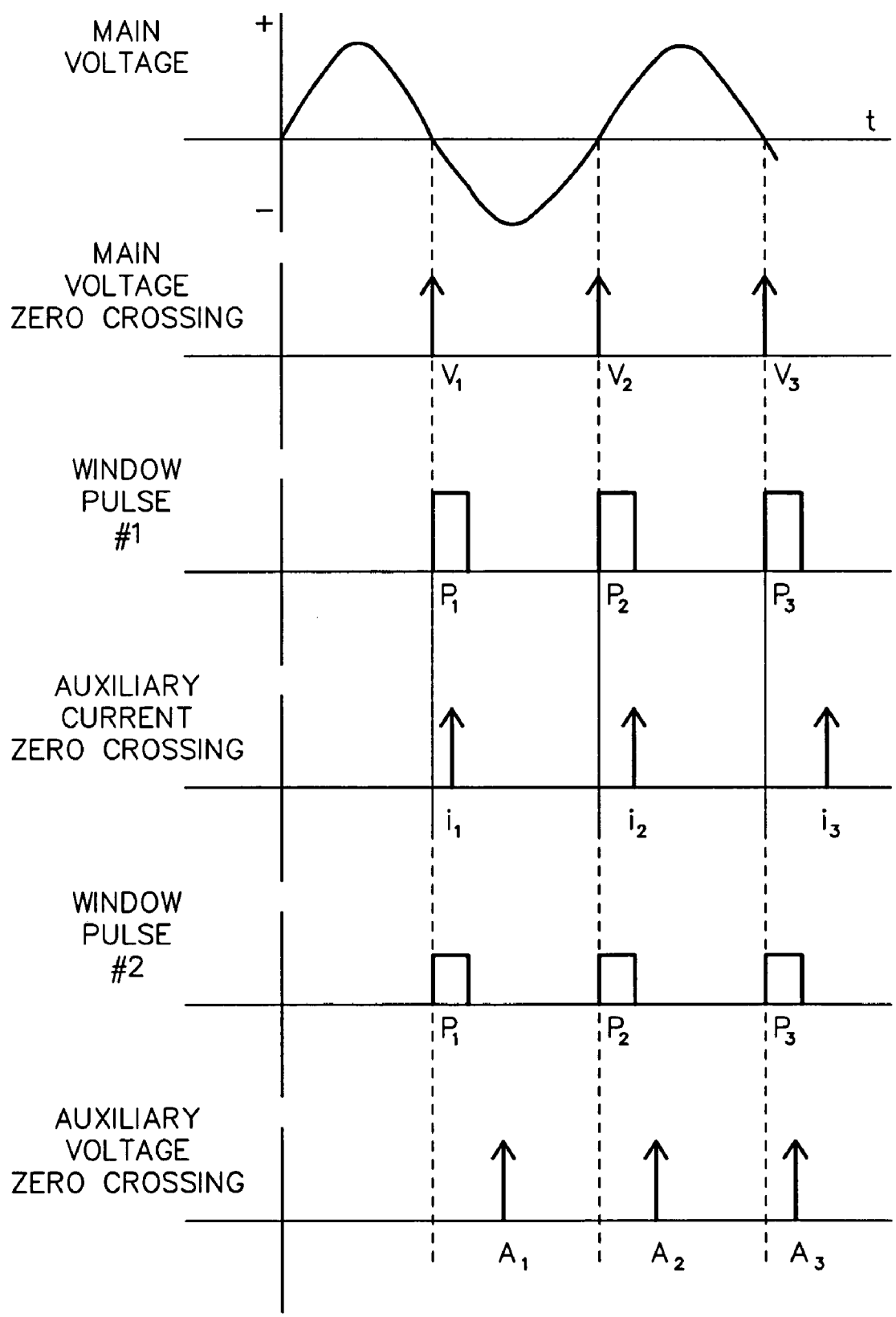
FIG. 4 is a timing diagram illustrating operation of the circuitry of FIGS. 2 and 3.

Referring now to FIG. 4, it will be demonstrated how the main voltage detecting means 7 in the circuit of the present invention views the magnitude of the main winding voltage, shown in the top graph as a generally sinusoidal waveform. The graph below it shows the points V1, V2, V3 at which the main winding voltage crosses zero. That is, the points at which voltage polarity is instantaneously reversed. The next graph illustrates that, at each of these voltage zero crossing points V1, V2, V3, a first window pulse P1, P2, P3, respectively, is generated by the window pulse means 11a. As the speed of the motor "ramps up" or increases, the auxiliary winding current zero crossing means 12b senses the current flow through the auxiliary winding 2 and the points I1, I2, I3 at which the auxiliary winding current "crosses" zero or switches flow direction. Phase comparison means 14 is provided to sense the auxiliary winding current zero crossing points I1, I2, I3 in relation to the main voltage first window pulses P1, P2, P3. As the auxiliary current zero crossing point I3, for example, falls outside the window pulse P3, the phase comparator 14 generates a pulse shape 16 to be received by the logic control 17 and turn off the triac driver 18. If, because of load increase causing a reduction of motor speed, the auxiliary winding 2 needs to be reenergized, the phase comparison means 13 is activated to the restart condition, which is the same as the initial motor start condition. The starting sequence is thereby reactivated to connect the auxiliary winding 2. The sequence in that phase comparison 13 is activated by the sensing of an auxiliary voltage zero crossing A3 that falls within a second window pulse P3, the second window pulse being smaller than the first window pulse but such is not a limitation of the present invention. This sensing is used for initial turn on the triac 18 after which the phase comparison means 14 is used to maintain the auxiliary winding 2 reenergization until the motor speed increases to the desired auxiliary winding denergization speed.

Accordingly, it will be apparent that there has been provided a new and useful circuit and method for measuring the voltage at the main motor winding and detecting points in the electromagnetic wave cycle where the main winding voltage "crosses" zero. The method and circuit measures the current at the auxiliary motor winding. The circuit and method detects the points in the electromagnetic wave cycle at which the current in the auxiliary winding "crosses" zero and compares the phase of these current zero crossing points with a first window pulse that is generated when the main winding voltage crosses zero. When the zero current crossing point falls outside the first window pulse, the auxiliary winding is up to proper operating speed and the auxiliary winding is disconnected by the switching circuit. The method and circuit also measures the voltage zero crossing at the auxiliary motor winding. That is, the circuit and method detects the points in the electromagnetic wave cycle at which the voltage in the auxiliary winding "crosses" zero and compares the phase of these voltage zero crossing points with a second window pulse that is generated when the main winding voltage crosses zero. When the auxiliary zero voltage crossing point falls within the second window pulse, the auxiliary winding will again be switched back into the circuit to boost the speed of the main motor winding.

The scope of this invention is to include deenergization of the auxiliary winding based on current phase changes with motor speed of the main winding and/or the auxiliary winding current or voltage. With the auxiliary winding energized, both the main winding and auxiliary winding current phases change with motor speed during the motor starting or slowing. The disclosed circuit functions on the phase shift of the auxiliary winding relative to the line voltage phase. The main winding current phase shift with motor speed change is in the opposite direction as found for the auxiliary current. A change in logic and the circuit location of the current sensor from the auxiliary winding to the main winding could have been made to activate the deenergization of the auxiliary winding on the phase shift of the main winding current relative to the line voltage. Further, with two current sensors, the deactivation could have been activated by comparison of the phase of the auxiliary winding relative to the main winding. The circuit previously described in detail is an embodiment based on an attempt to minimize the cost of achieving the desired control. it is to be understood that the scope of the disclosure and appended claims are not limited to the specific embodiments described and depicted herein.

The principles of this invention having been fully explained in connection with the foregoing, I hereby claim as my invention:

1. In an AC motor having a main winding and an auxiliary winding both connectable to an AC power source, and having a switch for disconnecting said auxiliary winding from said AC source, an improved control circuit for said switch comprising main voltage zero crossing detector means for sensing the points at which main winding voltage polarity is instantaneously reversed, window pulse generating means for generating a first pulse window and a second pulse window at the points at which main winding voltage polarity is reversed, auxiliary voltage detector means for sensing the points at which the AC auxiliary winding voltage polarity is instantaneously reversed, auxiliary current zero crossing detector means for sensing the points at which auxiliary current flow changes direction, and a first phase comparator means for sensing the phase shift between the main voltage zero crossing points and the auxiliary current zero crossing points, a second phase comparator means for sensing the phase shift between the main voltage zero crossing points and the auxiliary voltage zero crossing points, wherein the first phase comparator means operates to disconnect the auxiliary winding when the phase shift of the auxiliary winding current zero crossing falls outside the first main voltage window pulse as a function of motor speed, and wherein the second phase comparator means operates to connect or reconnect the auxiliary winding when the phase shift of the auxiliary winding voltage zero crossing falls within the second main voltage window pulse as a function of motor speed.

2. The control circuit of claim 1 wherein said first phase comparator includes pulse shape generating means for generating a first logic pulse and said second phase comparator includes pulse shape generating means for generating a second logic pulse.

3. The control circuit of claim 2 wherein said first and second logic pulses are used by a logic controller to turn said switch on and off.

4. The control circuit of claim 3 wherein said switch comprises a triac device that is triggered by a negative voltage value.

5. In an AC motor having a main winding and an auxiliary winding both connectable to an AC power source, and having a switch for disconnecting said auxiliary winding from said AC source, an improved method for controlling said switch comprising the steps of sensing the points at which AC main winding voltage polarity is instantaneously reversed, generating a first pulse and a second pulse at the points at which main winding voltage polarity is reversed, sensing the points at which auxiliary current flow changes direction, sensing a first phase shift between the main voltage zero crossing points and the auxiliary current zero crossing points, sensing the points at which auxiliary voltage polarity is reversed, sensing a second phase shift between the main voltage zero crossing points and the auxiliary voltage zero crossing points, wherein the first phase shift operates to disconnect the auxiliary winding when the first phase shift of the auxiliary winding current zero crossing falls outside the main voltage first pulse as a function of motor speed and wherein the second phase shift operates to connect or reconnect the auxiliary winding when the second phase shift of the auxiliary winding voltage zero crossing falls within the main voltage second pulse.

6. The method of claim 5 including the steps of generating a first logic pulse and a second logic pulse as a result of phase comparison.

7. The method of claim 6 wherein said first and second logic pulses are used by a logic controller to turn said switch on and off.

8. The method of claim 7 including the step of providing a triac device that is triggered by a negative voltage value as the switch.

* * * * *